United States Patent
Zhou et al.

(10) Patent No.: US 9,819,532 B2
(45) Date of Patent: Nov. 14, 2017

(54) MULTI-SERVICE NODE MANAGEMENT SYSTEM, DEVICE AND METHOD

(75) Inventors: Jianjun Zhou, Shenzhen (CN); Zhan Wu, Shenzhen (CN); Lin Xiao, Shenzhen (CN)

(73) Assignee: Huawei Technologies Co., Ltd., Shnezhen (CN)

( * ) Notice: Subject to any disclaimer, the term of this patent is extended or adjusted under 35 U.S.C. 154(b) by 85 days.

(21) Appl. No.: 13/593,713

(22) Filed: Aug. 24, 2012

(65) Prior Publication Data

US 2012/0324088 A1    Dec. 20, 2012

Related U.S. Application Data

(63) Continuation of application No. PCT/CN2011/072749, filed on Apr. 13, 2011.

(51) Int. Cl.
   *G06F 15/173* (2006.01)
   *H04L 12/24* (2006.01)
   *H04L 29/08* (2006.01)

(52) U.S. Cl.
   CPC ............ *H04L 41/00* (2013.01); *H04L 67/125* (2013.01)

(58) Field of Classification Search
   CPC ............................. H04L 67/125; H04L 41/00
   USPC ........................................................ 709/223
   See application file for complete search history.

(56) References Cited

U.S. PATENT DOCUMENTS

| | | | |
|---|---|---|---|
| 6,390,379 B1 * | 5/2002 | Huang | 236/49.3 |
| 6,661,671 B1 | 12/2003 | Franke et al. | |
| 2004/0260936 A1 * | 12/2004 | Hiray et al. | 713/200 |
| 2005/0216627 A1 * | 9/2005 | Goud et al. | 710/100 |
| 2006/0095595 A1 * | 5/2006 | Dalton et al. | 710/5 |
| 2006/0136754 A1 | 6/2006 | Liu et al. | |
| 2006/0143602 A1 * | 6/2006 | Rothman et al. | 717/171 |
| 2007/0033438 A1 * | 2/2007 | Hsieh | 714/24 |
| 2007/0094426 A1 * | 4/2007 | Chiang et al. | 710/73 |
| 2008/0043769 A1 * | 2/2008 | Hirai | H04L 45/00 370/420 |
| 2008/0137658 A1 | 6/2008 | Wang | |
| 2008/0140819 A1 * | 6/2008 | Bailey et al. | 709/223 |

(Continued)

FOREIGN PATENT DOCUMENTS

| | | |
|---|---|---|
| CN | 1983975 A | 6/2007 |
| CN | 101030880 A | 9/2007 |

(Continued)

OTHER PUBLICATIONS

PCT International Search Report dated Jan. 19, 2012, issued in related International Application No. PCT/CN2011/072749, Huawei Technologies Co., Ltd. (14 pages).

(Continued)

*Primary Examiner* — Oanh Duong
(74) *Attorney, Agent, or Firm* — Brinks Gilson & Lione

(57) ABSTRACT

A multi-service node management system includes: at least two service nodes, where each of the service node is disposed with a baseboard management controller (BMC); a module management controller (MMC), having one end configured to perform data communication with the BMC in each service node of the at least two service nodes, and the other end performing data communication with a shared module; and the shared module, on which sharing management is performed by BMCs in the service nodes through an MMC.

17 Claims, 4 Drawing Sheets

(56) References Cited

U.S. PATENT DOCUMENTS

| | | |
|---|---|---|
| 2008/0162956 A1 | 7/2008 | Bozek et al. |
| 2008/0278508 A1 | 11/2008 | Anderson et al. |
| 2009/0055665 A1* | 2/2009 | Maglione et al. ............ 713/320 |
| 2009/0063841 A1* | 3/2009 | Chien .............................. 713/2 |
| 2009/0113198 A1* | 4/2009 | Liu et al. ........................ 713/2 |
| 2009/0150691 A1 | 6/2009 | Chen et al. |
| 2009/0175602 A1* | 7/2009 | Qian et al. .................... 388/825 |
| 2010/0023742 A1* | 1/2010 | Chen et al. ...................... 713/2 |
| 2010/0332890 A1* | 12/2010 | Chen et al. ...................... 714/2 |
| 2011/0145422 A1* | 6/2011 | Duisenberg et al. ......... 709/228 |
| 2012/0123597 A1* | 5/2012 | Cepulis .................. G06F 1/206 700/282 |
| 2012/0136489 A1* | 5/2012 | Wang et al. .................. 700/282 |
| 2012/0324088 A1* | 12/2012 | Zhou et al. ................... 709/223 |
| 2014/0006815 A1* | 1/2014 | Castro-Leon ......... G06F 9/5094 713/310 |

FOREIGN PATENT DOCUMENTS

| | | |
|---|---|---|
| CN | 101458552 A | 6/2009 |
| CN | 101639780 A | 2/2010 |
| CN | 101751108 A | 6/2010 |
| EP | 2-161-647 A1 | 3/2010 |
| WO | WO 2011/019337 A1 | 2/2011 |

OTHER PUBLICATIONS

European Patent Office Communication dated Aug. 17, 2012; issued in related Application No. 11744279.8-2416; regarding the extended European search report, pursuant to Rule 62 EPC, the supplementary European search report (Art. 153 (7) EPC) and the European search opinion; Huawei Technologies Co., Ltd. (7 pgs.).
Office Action issued in corresponding Chinese Patent Application No. 201180000328.8, dated Jan. 5, 2013.

* cited by examiner

MULTI-SERVICE NODE MANAGEMENT SYSTEM, DEVICE AND METHOD

CROSS-REFERENCE TO RELATED APPLICATIONS

This application is a continuation of International Application No. PCT/CN2011/072749, filed on Apr. 13, 2011, which is hereby incorporated by reference in its entireties.

FIELD OF THE INVENTION

The present invention relates to the field of computer technologies, and in particular, to a multi-service node management system, device and method.

BACKGROUND OF THE INVENTION

At present, in a management system formed by multiple servers (such as a cloud server management system), each server is called a service node, and the service nodes share a fan module and a power supply module. Each service node is disposed with a BMC (Baseboard Management Controller, baseboard management controller), and a remote host may send a management command to the BMC in the service node through an SMM (System Management Module, system management module), so as to realize remote management of the service node. The remote host may also manage the fan module and the power supply module through the SMM. However, in the prior art, the remote host cannot realize management of the fan module and the power supply module through the service node.

SUMMARY OF THE INVENTION

Embodiments of the present invention provide a multi-service node management system, device and method, to realize management of a shared module in a multi-service node system through a service node.

In order to achieve the foregoing objectives, the embodiments of the present invention adopt the following technical solutions:

In one aspect, a multi-service node management system is provided, which includes:

at least two service nodes, where each of the at least two service nodes is disposed with a baseboard management controller BMC;

a module management controller MMC, having one end configured to perform data communication with the BMC in each service node of the at least two service nodes, and the other end performing data communication with a shared module; and the shared module, on which sharing management is performed by BMCs in the service nodes through an MMC.

In one aspect, a module management controller is provided, where one end of the module management controller is configured to perform data communication with a BMC in each service node of at least two service nodes, the other end of the module management controller performs data communication with a shared module, and the module management controller includes:

a receiving unit, configured to receive a management command sent by the baseboard management controller BMC in the service node; and an executing unit, configured to manage the shared module according to the management command.

In another aspect, a multi-service node management method is provided, which includes:

receiving a management command sent by a BMC in each service node of at least two service nodes; and managing a shared module according to the management command.

According to the embodiments of the present invention described in the foregoing technical solutions, when a remote host needs to manage the shared module, the management command may be sent to the MMC through the BMC in the service node. At this time, the MMC receives the management command sent by the baseboard management controller BMC in the service node; and manages the shared module according to the management command. In this way, the remote host is enabled to realize management of the shared module through the BMC in the service node.

BRIEF DESCRIPTION OF THE DRAWINGS

To illustrate the technical solutions according to the embodiments of the present invention or the prior art more clearly, the accompanying drawings for describing the embodiments or the prior art are introduced briefly in the following. Apparently, the accompanying drawings in the following description are only some embodiments of the present invention, and persons of ordinary skill in the art may further derive other drawings according to these accompanying drawings without creative efforts.

DETAILED DESCRIPTION OF THE EMBODIMENTS

The technical solutions in the embodiments of the present invention will be clearly and fully described in the following with reference to the accompanying drawings. Apparently, the embodiments to be described are only part rather than all of the embodiments of the present invention. All other embodiments derived by persons of ordinary skill in the art based on the embodiments of the present invention without creative efforts shall fall within the protection scope of the present invention.

Figure 1:
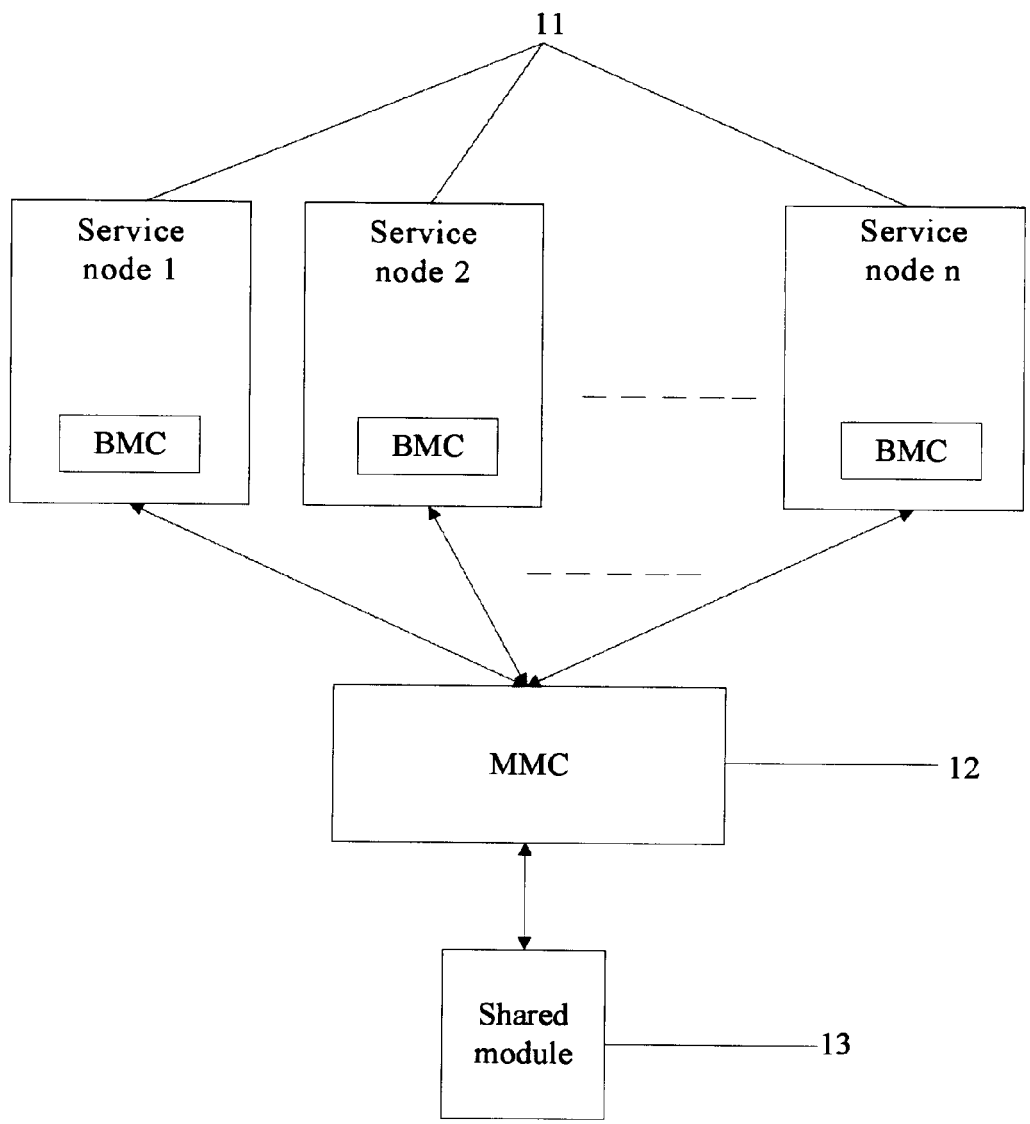
FIG. 1 is a structural diagram of a multi-service node management system according to an embodiment of the present invention.

As shown in FIG. 1, a multi-service node management system in an embodiment of the present invention includes: at least two service nodes 11, an MMC 12 and a shared module 13. For the at least two service nodes 11, each of the service nodes 11 is disposed with a baseboard management controller BMC. The MMC (module management controller) 12 has one end that is configured to perform data communication with the BMC in each service node 11 of the at least two service nodes 11, and the other end performing data communication with the shared module.

Sharing management is performed on the shared module 13 by BMCs in the service node 1 is through an MMC.

In the embodiment of the present invention, when a remote host needs to manage the shared module, a management command may be sent to the MMC through the BMC in the service node. At this time, the MMC receives the management command sent by the baseboard management controller BMC in the service node; and manages the shared module according to the management command. In this way, the remote host realizes management of the shared module through the BMC in the service node.

Figure 2:
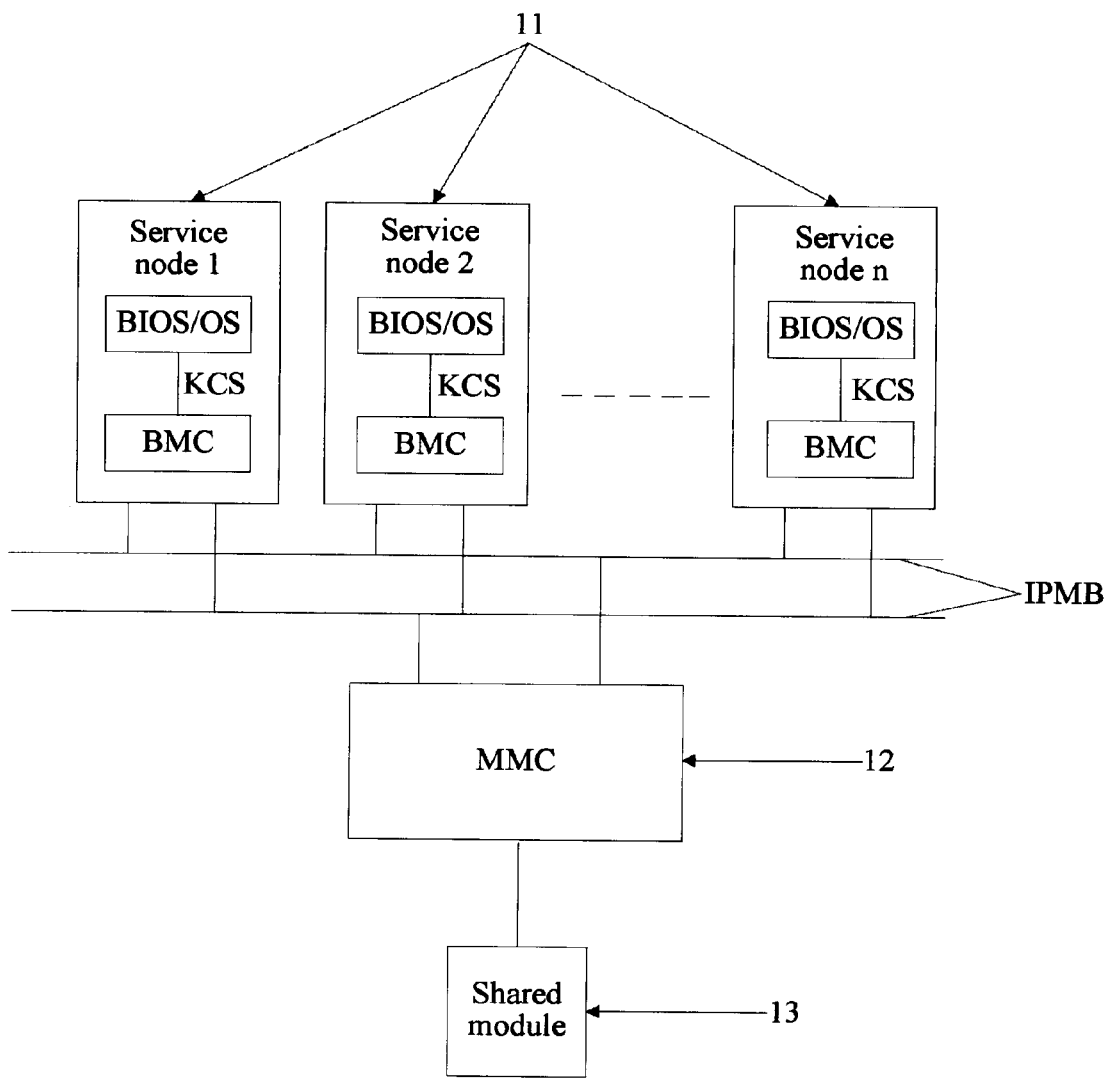
FIG. 2 is another structural diagram of a multi-service node management system according to an embodiment of the present invention.

Further, the at least two service nodes 11 may be mutually connected through a local area network. As shown in FIG. 2, on one hand, the BMC in the service node 11 performs data communication with a BIOS and an OS in the service node 11 through a KCS interface, and when the BMC in the service node 11 receives an input first management command, at this time, the BMC in the service node 11 may manage the service node 11 through the KCS interface. For example, the BMC may realize monitoring of system resources of a board of the service node 11, including voltage, temperature, and system starting process of various sensors of the board, and the BMC may also realize management of the system resources of the board, including power on and power off of the board, setting of various configurations and query.

The first management command is used to manage and control the service node, and the first management command may be input by the remote host, and at this time, direct management and control of the service node by the remote host may be realized, or the first management command may be from other service nodes, and at this time, remote control and management among the service nodes may be realized.

On the other hand, the BMC in the service node 11 performs data communication with the MMC through an IPMB (Intelligent Platform Management Bus, intelligent platform management bus). When the BMC in the service node 11 receives an input second management command (the second management command is used to manage and control the shared module, and may be input by the remote host), the BMC in the service node 11 may send the second management command to the MMC through the IPMB, instructing the MMC to implement management of the shared module according to the second management command.

As shown in FIG. 2, a manner of realizing data communication between the BMC of the service node 11 and the MMC through the IPMB is that: the BMC performs data communication with the MMC through a backplane; the backplane may provide two IPMB buses; normally the two IPMB buses may be simultaneously configured for data communication between the BMC and the MMC; and when one of the IPMB buses fails, the MMC performs recovery or isolation.

It can be seen from the relevant description in FIG. 2 that, in the embodiment of the present invention, not only the management of the shared module by the remote host through the service node may be realized, but also direct management and control of the service node by the remote host may be realized, or remote control of one service node over other service nodes may be realized. The embodiment of the present invention enriches the manner of managing the service node, and particularly in the multi-service node system, management of the service node becomes more flexible by adopting the method provided in the embodiment of the present invention.

Particularly, when the BMC in the service node sends a management command to the MMC through the IPMB bus, at the same time, a management command may be sent by one service node, or management commands may be sent by multiple service nodes. For example, the BMCs in four service nodes send management commands at the same time; the MMC may receive the management commands sent by the BMCs in the four service nodes; and the MMC executes different processing according to the type of the received management command. For example, if a control command is received, the command is executed after arbitration; if a query command is received, the command may be executed directly.

Further, in a realizable application scenario, the shared module 13 includes a power supply module 130 or a fan module 131. That is, the at least two service nodes 11 share the power supply module 130 or the fan module 131.

Figure 3:
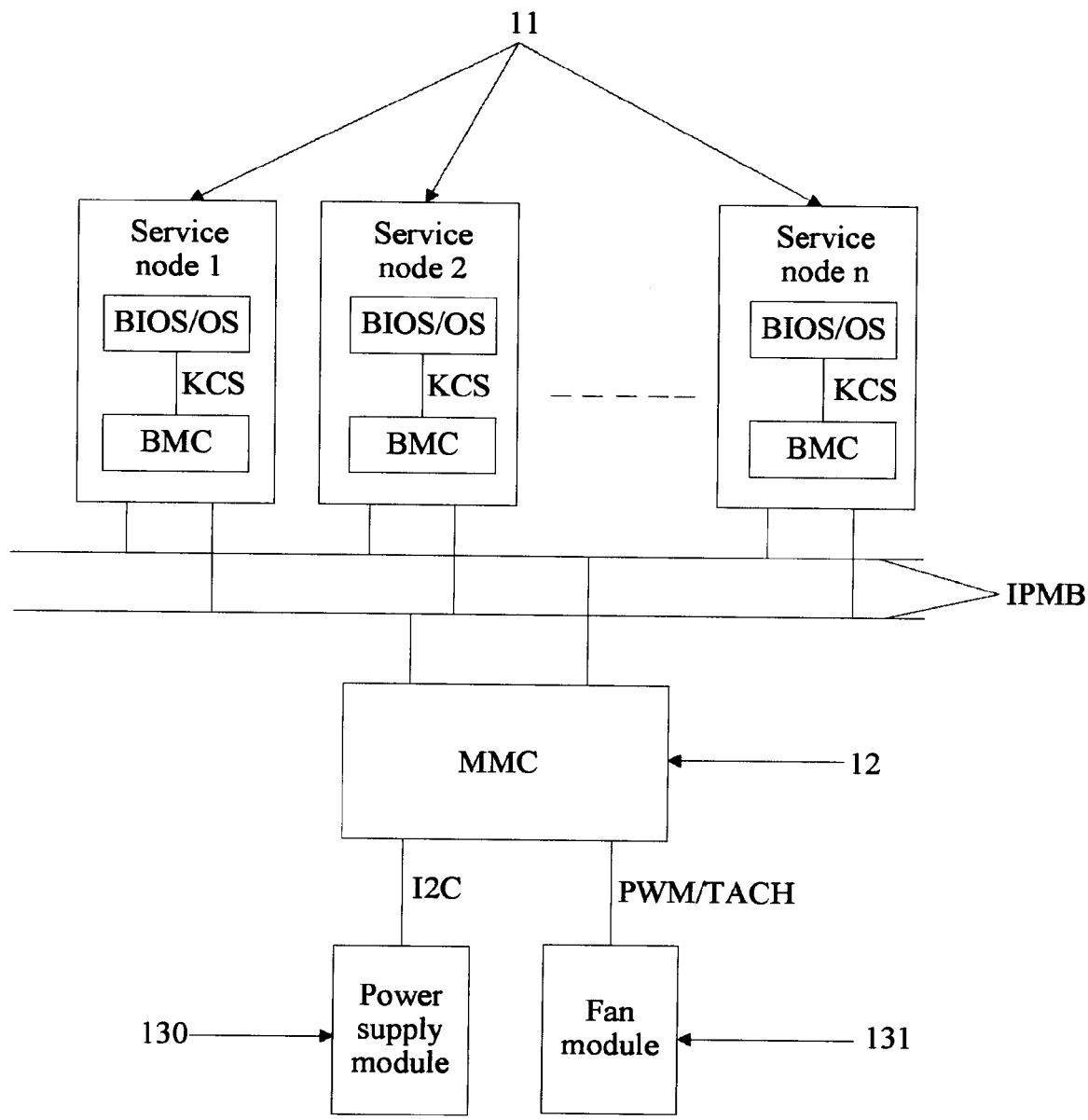
FIG. 3 is still another structural diagram of a multi-service node management system according to an embodiment of the present invention.

As shown in FIG. 3, on one hand, the MMC 12 may realize management of the fan module 131. Specifically, the MMC controls speed adjustment of the fan module 131 through a pulse-width modulation PWM signal, and the MMC detects a rotating speed of the fan module 131 through a rotating speed feedback TACH signal.

For example, a BMC in any service node determines an appropriate rotating speed A based on a speed adjustment algorithm according to a temperature condition of the service node, and sends the determined rotating speed A to the MMC through an IPMB bus; the MMC arbitrates according to an in-position condition of the service node and the rotating speed A sent by the BMC of the service node, and controls speed adjustment of the fan module 131 through a PWM signal, adjusting the rotating speed of the fan to the rotating speed A. In addition, the MMC may also detect an operating condition of the fan through a TACH signal (rotating speed feedback signal). The specific number of signal definitions may be determined according to the number of fans and power supplies in actual implementations, and is not limited here.

As shown in FIG. 3, on the other hand, the MMC 12 performs data communication with the power supply module 130 through an I2C bus, so as to realize management of the power supply module 130.

Specifically, the MMC is connected to the power supply module 130 through two I2C buses, and at the same time, the MMC provides a GPIO pin for the convenience of detecting the in-position condition of the power supply module 130 and a POK; the MMC also supports query of output power of the power supply module 130, in-position detection of the power supply module 130, and unsolicited reporting of power supply alarms.

The MMC performs data communication with the power supply module 130 through a power management bus PMBUS protocol or a PSMI protocol. Further, the MMC may specifically use a SoC (system-on-chip) or a chip with functions of a processor.

In the embodiment of the present invention, only one MMC may be needed, and the MMC may simply use a SoC or a chip with functions of a processor, so that the hardware cost is reduced greatly while realizing management of the shared module through one independent MMC and the BMC in the service node.

Figure 4:
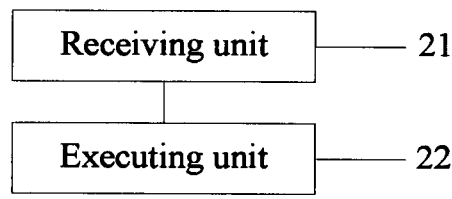
FIG. 4 a structural diagram of a module management controller according to an embodiment of the present invention.

As shown in FIG. 4, an embodiment of the present invention provides a module management controller, where one end of the module management controller is configured to perform data communication with a BMC in each service node of at least two service nodes, the other end of the module management controller performs data communication with a shared module, and the module management controller includes a receiving unit 21 and an executing unit 22.

The receiving unit 21 is configured to receive a management command sent by the baseboard management controller BMC in the service node. The executing unit 22 is configured to manage the shared module according to the management command. Specifically, the receiving unit 21 is configured to receive the management command sent by the BMC in the service node through an IPMB, and the executing unit 22 is configured to control speed adjustment of a fan module through a pulse-width modulation PWM signal.

The executing unit 22 may be further configured to detect a rotating speed of the fan module through a rotating speed feedback TACH signal. The executing unit 22 may be further configured to manage the power supply module through an I2C bus according to the management command. The module management controller may specifically use a SoC (system-on-chip) or a chip with functions of a processor.

In the embodiment of the present invention, the module management controller MMC receives the management command sent by a remote host through the BMC in the service node; and manages the shared module according to the management command. In this way, the remote host realizes management of the shared module through the BMC in the service node.

Figure 5:
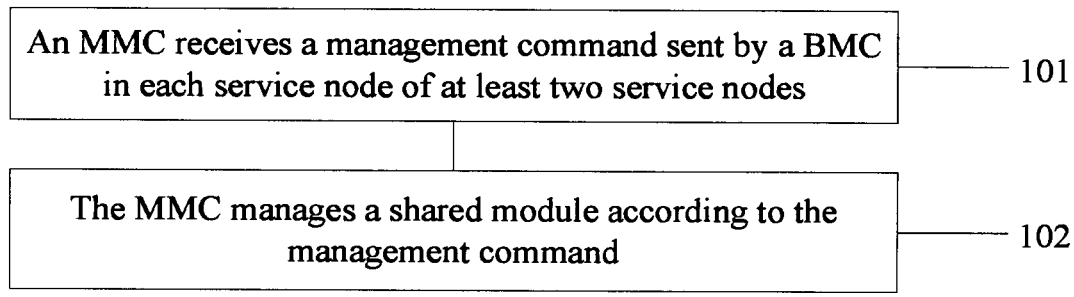
FIG. 5 is a flow chart of a multi-service node management method according to an embodiment of the present invention.

As shown in FIG. 5, an embodiment of the present invention provides a multi-service node management method, which includes:

101. An MMC receives a management command sent by a BMC in each service node of at least two service nodes; and 102. The MMC manages a shared module according to the management command.

For the structural relationship of the MMC, the service node and the shared module in this method, reference may be made to the structural diagram of the multi-service node management system shown in FIG. 1.

The module management controller MMC receives the management command sent by a remote host through the BMC in the service node; and manages the shared module according to the management command. In this way, the remote host realizes management of the shared module through the BMC in the service node.

Specifically, step 101 may be implemented in the following manner: the MMC receives the management command sent by the BMC in each service node of the at least two service nodes through an IPMB.

The management command is used to manage and control the shared module, and may be input by the remote host; the MMC may also receive another management command, the another management command is used to manage and control the service node; the another management command may be input by the remote host, and at this time, direct management and control of the service node by the remote host may be realized, and the another management command may also be from other service nodes, and at this time, remote control and management among the service nodes may be realized.

Specifically, in a realizable application scenario (reference may be made to the structural diagram shown in FIG. 3), the shared module includes a power supply module or a fan module; at this time, in step 102, the managing the shared module according to the management command specifically includes the following implementation manners:

when management of the fan module may be realized through the MMC, controlling speed adjustment of the fan module through a pulse-width modulation PWM signal; or, detecting a rotating speed of the fan module through a rotating speed feedback TACH signal; and when management of the power supply module may be realized through the MMC, managing the power supply module through an I2C bus according to the management command.

The embodiments of the present invention are mainly applied to a multi-service node management process to realize management of a shared module in a multi-service node system through a service node.

The foregoing descriptions are merely specific embodiments of the present invention, but the protection scope of the present invention is not limited thereto. Any change or improvement that can be easily thought of by persons skilled in the art within the technical scope disclosed by the present invention shall fall within the protection scope of the present invention. Therefore, the protection scope of the present invention shall be subject to the protection scope of the claims.

What is claimed is:

1. A multi-service node management system, comprising:
   at least two service nodes, wherein each of the at least two service nodes is disposed with a respective baseboard management controller (BMC), each of at least two BMCs configured to receive a management command from a remote host and send the management command to a module management controller (MMC);
   the MMC having one end configured to perform data communication with the BMC in each service node of the at least two service nodes, and the other end configured to perform data communication with a shared module, receive at least two management commands sent by the BMCs in the at least two service nodes, determine whether the received management commands are control commands or query commands, arbitrate the management commands when the management commands are determined to be control commands, manage the shared module according to a management command after arbitration, and execute the management commands directly when the management commands are determined to be query commands; and
   the shared module, on which a sharing management is performed by the BMCs in the service nodes through the MMC;
   wherein the shared module comprises a power supply module or a fan module.

2. The multi-service node management system according to claim 1, wherein the BMC in each of the at least two service nodes is configured to perform data communication with the MMC through an intelligent platform management bus (IPMB).

3. The multi-service node management system according to claim 2, wherein the BMC in each of the at least two service nodes is configured to determine an rotating speed based on a speed adjustment algorithm according to a temperature condition of the service node and send the determined rotating speed to the MMC through the IPMB.

4. The multi-service node management system according to claim 3, wherein the MMC is configured to arbitrate according to an in-position condition of each service node and the rotating speed sent by the BMC, and control speed adjustment of the fan module through a pulse-width modulation (PWM) signal.

5. The multi-service node management system according to claim 1, wherein when the shared module comprises the power supply module, the MMC is configured to perform data communication with the power supply module through an I2C bus.

6. The multi-service node management system according to claim 1, wherein when the shared module comprises the fan module, and the MMC is configured to control a speed adjustment of the fan module through a pulse-width modulation (PWM) signal, or detect a rotating speed of the fan module through a rotating speed feedback signal.

7. The multi-service node management system according to claim 1, wherein the BMC is further configured to receive another management command from the remote host or other service node, and to manage the BMC's service node according to the other management command.

8. A module management controller, wherein the module management controller is configured to perform data communication with a respective baseboard management controller (BMC) in each service node of at least two service nodes, and the other is configured to perform data communication with a shared module, the module management controller comprising:
   a processor and a memory, the memory having instructions stored therein that program the processor to:
   receive at least two management commands sent by the BMCs in the at least two service nodes, wherein each of the at least two management commands is received by the BMC from a remote host; and
   determine whether the received management commands are control commands or query commands, arbitrate the management commands when the management commands are determined to be control commands, manage the shared module according to a management command after arbitration, and execute the management commands directly when the management commands are determined to be query commands;
   wherein the shared module comprises a power supply module or a fan module.

9. The module management controller according to claim 8, wherein the instructions program the processor to receive a management command sent by a BMC in a service node through an intelligent platform management bus (IPMB).

10. The module management controller according to claim 8, wherein,
   when the shared module comprises the power supply module, the instructions program the processor to manage the power supply module through an I2C bus according to the management command.

11. The module management controller according to claim 8, wherein when the shared module comprises the fan module, the instructions program the processor to control speed adjustment of the fan module through a pulse-width modulation (PWM) signal, or detect a rotating speed of the fan module through a rotating speed feedback signal.

12. The module management controller according to claim 8, wherein the processor is programmed to arbitrate according to an in-position condition of each service node and a rotating speed sent by the BMC, and control speed adjustment of the fan module through a pulse-width modulation (PWM) signal.

13. A multi-service node management method, comprising:
   receiving, by a module management controller (MMC), at least two management commands sent by a respective baseboard management controller (BMCs) in at least two service nodes, wherein each of the at least two management commands is received by a BMC from a remote host;
   determining, by the MMC, whether the received management commands are control commands or query commands;
   executing, by the MMC, the management commands directly when the management commands are determined to be query commands;
   arbitrating, by the MMC, the management commands when the management commands are determined to be control commands; and
   managing a shared module according to a management command after arbitration;
   wherein the shared module comprises a power supply module or a fan module.

14. The multi-service node management method according to claim 13, wherein a management command is sent by a BMC in each service node of the at least two service nodes through an intelligent platform management bus (IPMB).

15. The multi-service node management method according to claim 13, wherein when the shared module comprises the power supply module, the method further comprising:
   managing the power supply module through an I2C bus.

16. The multi-service node management method according to claim 13, wherein when the shared module comprises the fan module, the method further comprising controlling a speed adjustment of the fan module through a pulse-width modulation (PWM) signal.

17. The multi-service node management method according to claim 13, wherein when the shared module comprises the fan module, the method further comprising detecting a rotating speed of the fan module through a rotating speed feedback signal.

* * * * *